United States Patent [19]
Misak

[11] 3,922,173
[45] Nov. 25, 1975

[54] TEMPERATURE-STABLE AQUEOUS GELS
[75] Inventor: Marvin D. Misak, Duncan, Okla.
[73] Assignee: Halliburton Company, Duncan, Okla.
[22] Filed: July 22, 1974
[21] Appl. No.: 490,460

[52] U.S. Cl. ................. 106/194; 106/204; 187/82; 260/232
[51] Int. Cl.² ........................................... C08L 1/28
[58] Field of Search ............ 106/194, 209; 260/232, 260/231; 127/32

[56] References Cited
UNITED STATES PATENTS

| | | | |
|---|---|---|---|
| 3,251,781 | 5/1966 | Jordan | 106/209 |
| 3,359,224 | 12/1967 | Faessinger | 8/116 R |
| 3,728,331 | 4/1973 | Savage | 260/232 |
| 3,816,151 | 6/1974 | Podlas | 106/194 |

*Primary Examiner*—Theodore Morris
*Attorney, Agent, or Firm*—Thomas R. Weaver; John H. Tregoning

[57] ABSTRACT

A process for producing a controlled reduction in viscosity of aqueous gels at elevated temperatures is disclosed wherein t-butyl hydroperoxide is utilized as a chemical breaker. A gel structure having improved temperature stability properties which is useful for fracturing subterranean formations is disclosed wherein the gel comprises an aqueous liquid, a gelling agent, and t-butyl hydroperoxide.

11 Claims, No Drawings

TEMPERATURE-STABLE AQUEOUS GELS

This invention relates to gelled fluids. It more particularly relates to the conversion of gelled fluids to fluids of reduced viscosity through the use of chemical agents incorporated in the gelled fluid. This invention is still further related to the conversion of temperature-stable gelled fluids used in the hydraulic fracturing of subterranean formations to fluids of reduced viscosity.

Hydraulic fracturing can be used to stimulate the production of oil and gas from wells completed in low permeability formations; accordingly, many compositions useful for hydraulically fracturing subterranean well formations penetrated by a well bore have been developed. Among the various compositions are high viscosity fluids, referred to hereinafter as gels or as gelled fluids, which are used as fracturing fluids.

Commonly, in the art of hydraulic fracturing, a gelled fluid is introduced into the formation sought to be fractured. The gel is introduced at a rate and pressure sufficient to produce a fracture in the formation, and to extend the produced fracture from the well bore into the formation. The gelled fluid can be accompanied by a propping agent which results in placement of the propping agent within the fracture thus produced. Following the fracturing treatment, the gelled fluid is converted, i.e. broken, to a lower viscosity and then recovered from the formation, but the proppant remains in the produced fracture to thereby prevent the complete closure thereof and to thereby form a propped fracture having a conductive channel extending from the well bore into the formation.

The conductivity of the propped fracture is effected by the particle size of the propping agent placed in the fracture. The particle size of the propping agent which can be used depends upon the width to which the particular fracture can be opened during the introduction of the fracturing fluid; and fracture width is normally directly proportional to the viscosity of the gelled fluid. In addition, the use of gels having relatively high viscosities is advantageous since such fluids can support the propping agent particles suspended therein without excessive settling.

As indicated above, high viscosity gelled fluids used in hydraulic fracturing perform several functions which include influencing the physical size of the produced fracture and suspending and carrying propping agents into the fracture. However, the use of such high viscosity gelled fluids in fracturing is accompanied by the requirement that subsequent to the fracturing treatment they be readily removed from the formation in order to permit the flow of oil and gas from the formation.

The recovery of fracturing fluids has been accomplished by reducing the viscosity of the fluid to a low value such that it flows naturally from the formation under the influence of the formation fluids. This viscosity reduction or conversion is referred to as breaking and can be accomplished by incorporating chemical agents, referred to as breakers, into the initial gel.

The importance of breaking gelled fluids used to fracture underground formations in order to facilitate recovery of the fluids and to resume production has been discussed. Also of importance is the timing of the break. Gels which break prematurely can cause suspended proppant material to settle out of the gel before being introduced a sufficient distance into the produced fracture. This condition is known as sanding out. A sand out is a blockage in the fracture which prevents further introduction of fluid into the fracture.

Premature breaking, i.e., premature reduction of fluid viscosity, can also result in undesirable diminution of potential fracture width.

Another aspect of untimely breaking of gelled fluids used in hydraulic fracturing revolves about gelled fluids which break too slowly. Undesirably long breaking times cause slow recovery of the fracturing fluid from the produced fracture with attendant delay in resumption of production of formation fluids. Long breaking times can also cause placed proppant to become dislodged (by flow of unbroken gelled fluids) from the fracture thus resulting in at least partial closing and diminished efficiency of the fracture stimulation treatment.

Premature breaking is defined herein to mean that gel viscosity becomes diminished to an undesirable extent before all of the fluid is introduced into the formation to be fractured. Since all gels experience reduction of viscosity with increasing temperature and since desired viscosity can vary depending upon specific job conditions, it is evident that a minimum specific viscosity number is not relevant. What is relevant is the extent of change in desired viscosity for particular conditions of use. Accordingly, for purposes of this disclosure, a satisfactory gel useful for fracturing subterranean formations is one whose viscosity remains at about 50 percent, and more preferably at about 75 percent, of the initial viscosity of the gel (measured at expected operating temperature) after about 2 hours of exposure to expected operating temperature.

In the optimum sense, a fracturing gel will begin to break when the pumping operation ceases. For more practical considerations and thus for purposes of this disclosure, a useful gel will be completely broken within 24 hours after the completion of the fracturing treatment. A gel that is completely broken is defined herein to mean one that can be flushed from the formation by the flowing formation fluids or that can be removed by swabbing. For laboratory testing purposes, a completely broken non-crosslinked gel is defined herein to mean one whose viscosity is equal to or less than about 10 centipoises as measured on a Model 35 Fann Viscometer at 300 rmp. Also, for laboratory testing purposes, a completely broken crosslinked gel is defined herein to mean one whose viscosity is equal to or less than about 300 centipoises as measured on a Model LVF Brookfield Synchro-Lectric Viscometer at 6 rpm using a Number 3 spindle.

Certain gels, such as those based upon the guars, do undergo a natural break without the intervention of chemical additives; these natural breaks, however, occur over a period well in excess of 24 hours of exposure to temperature in excess of 80°F. Such breaks are accordingly considered to be too slow for fracturing gels.

In order to decrease the break time of gels used in fracturing, the art has developed chemical agents, i.e. breakers, which are incorporated in the gel recipe and become a part of the gel itself. Breakers used have been oxidizers, acids and enzymes which operate to degrade the polymeric gel structure. Of course, increased temperature accelerates the break rate, with the exception of enzymes which generally cease to function at temperatures in excess of about 140°F.

A problem, accordingly, now existant in the art with respect to the timely breaking of fracturing gels, resides not in obtaining a complete break within 24 hours, but rather in preventing a too rapid break. Breakers known in the art will produce a complete break within 24 hours, but these breakers also destroy much of the gel within a very short period of time, i.e. within the first hour, while the fracturing treatment is still in progress. Such breaks are premature within the meaning of this disclosure.

Accordingly, there is a need for a gel system used in fracturing or similar applications which will completely break within 24 hours, but which will maintain a satisfactory viscosity at operating temperatures for a time sufficient to complete the fracturing treatment.

I have now discovered that t-butyl hydroperoxide, when incorporated in a gelled fluid in proper concentrations, will cause the breaking of the gel to proceed gradually over an extended period of time in the presence of elevated temperatures.

More particularly, t-butyl hydroperoxide, when utilized as a breaking agent in a gel, functions to produce a fluid having a viscosity of about 10 centipoises and lower within about 24 hours, and it also functions to maintain gel viscosity at satisfactory levels during initial periods of use at operating temperatures. As previously defined, a satisfactory gel for fracturing subterranean formations is one whose viscosity, after a period of about 2 hours of exposure to operating temperatures, is not less than about 50 to about 75 percent of the initial viscosity of the gel when also measured at operating temperatures.

The use of t-butyl hydroperoxide as a breaking agent for gels used in fracturing is particularly advantageous when expected operating temperatures are in the range of about 140° to about 300°F and preferably in the range of about 160°F to about 260°F. Thus, in general, a gel having incorporated therein t-butyl hydroperoxide when subjected to temperatures in the range of about 140° to about 300°F will maintain a satisfactory level of viscosity over a suitable period of time but will completely break within about 24 hours.

Accordingly, by this invention there is provided a gelled fluid having improved temperature stability and a method of producing same.

The gelled fluid of this invention finds particular value as a fracturing fluid or gel used in the fracturing of subterranean formations such as hydrocarbon producing formations. The gelled fluid, being highly temperature stable, maintains satisfactorily high viscosities in the presence of elevated formation temperatures while the fracturing treatment is in progress, but it will nevertheless completely convert within 24 hours to a fluid having a suitably low viscosity to enable recovery of the fluid from the formation.

The gel of this invention is a composition consisting essentially of an aqueous liquid, a gelling agent and t-butyl hydroperoxide. The composition can optionally include a crosslinking agent to thereby form a crosslinked gel. Conventional propping agents can also be incorporated in the gel.

The aqueous liquid utilized herein is defined as a water-alcohol solution having 0 to 100, preferably 0 to 80, and still more preferably 0 to 40, percent alcohol by volume of solution. The preferred alcohols are alkanols having 1 to 5 carbon atoms. Examples of alcohols believed to be useful in the aqueous liquid include methanol, ethanol, propanol, isopropanol, butanol, isobutanol, pentanol, furfuryl alcohol, ethylene glycol, and ethoxylated derivatives thereof. The aqueous liquid should be relatively free of impurities of a size sufficient to interfere with the movement of the fluid in the conduit and pumping equipment used to introduce the gel into the formation.

The gelling agent useful in the present invention is selected from solvatable polysaccharides having molecular weights of at least about 100,000. Examples of solvatable polysaccharides useful herein include the galactomannan gums, glucomannan gums, and cellulose derivatives. Solvatable galactomannan gums and glucomannan gums are naturally occurring; however, cellulose is rendered solvatable by reacting cellulose with hydrophillic constituents.

The galactomannan gums and glucomannan gums can also be reacted with hydrophillic constituents to thereby produce gelling agents useful herein.

The most preferred solvatable polysaccharides useful herein have molecular weights in the range of from about 200,000 to about 300,000.

Guar gum, locust bean gum, karaya gum, sodium carboxymethylguar, hydroxyethylguar, sodium carboxymethylhydroxyethylguar, hydroxypropylguar, sodium carboxymethylhydroxypropylguar, sodium carboxymethylcellulose, sodium carboxymethylhydroxyethylcellulose, and hydroxyethylcellulose are examples of gelling agents useful herein. The hydroxyethylcellulose derivatives used as gelling agents should be those having in the range of about 0.5 to about 10, and preferably about 1.5 to about 2.5, moles of ethylene oxide per anhydroglucose unit.

The preferred gelling agents are guar gum, sodium carboxymethylcellulose, sodium carboxymethylhydroxyethylguar, and hydroxyethylcellulose.

The most preferred gelling agents for use in the present invention are sodium carboxymethylcellulose and hydroxyethylcellulose.

The gelling agent useful herein is present in the aqueous liquid in a concentration in the range of from about 10 to about 150, preferably about 25 to 120, and still more preferably from about 40 to about 100 pounds per 1,000 gallons of the aqueous liquid.

The t-butyl hydroperoxide useful as the breaking agent in the gel of this invention can be added to the aqueous liquid before it is gelled or to the previously gelled aqueous liquid, or it can be added to the aqueous liquid simultaneous with the addition thereto of the gelling agent. Election of the latter method of addition must not include direct combination of the breaker and the gelling rpm. Accordingly, simultaneous addition is accomplished by addition of the two materials to the aqueous liquid in two separate streams accompanied by appropriate mixing.

Whether the breaker is added to the aqueous liquid after it is gelled, before it is gelled, or at the time of formation of the gel is discretionary with the particular user. However, since a gelled fluid begins to break at the time it is contacted with the breaker, it is suggested that the time of addition of the breaker be reasonably near in time to the use of the gel.

The t-butyl hydroperoxide is present in the gel in the range of about 0.0007 to about 50, preferably about 0.0035 to about 35, and still more preferably about 0.007 to about 3.5 gallons per 1000 gallons of aqueous liquid. The concentrations of t-butyl hydroperoxide recited above are with respect to the 100 percent active material. Addition of the specified amount of the breaker in diluted form is within the scope of this disclosure.

The t-butyl hydroperoxide breaker is also quite effective in breaking crosslinked gels prepared by adding a metal ion as a crosslinking agent to the previously formed gel, as above described, which is referred to herein as the base gel.

The crosslinking agents useful herein include any compound which will provide the crosslinking metal ion to the solution. Examples of these ions are aluminum(III), boron(III), antimony(III), antimony(V), titanium(II), titanium(IV), chromium(VI), chromium(III), iron(II), iron(III), nickel(II), niobium(V), manganese(VII), arsenic(III), arsenic(V), tantalum(V), tin(II), and lead(II). Specific crosslinking agents useful herein include, but are not limited to, potassium pyroantimonate, sodium dichromate, ammonium tetralactotitanate(IV), and bis(triethanolamine)bis(isopropo)-titanium(IV).

The amount of crosslinking agent useful is in the range of from about 0.001 to in excess of 0.5 percent by weight of the aqueous liquid. The preferred concentrations of crosslinking agent are in the range of from about 0.006 to about 0.25, and still further preferred about 0.009 to about 0.1 percent by weight of the aqueous liquid.

The crosslinked gel can be prepared for use by mixing a predetermined quantity of the solvatable polysaccharide gelling agent with a quantity of aqueous liquid to form the base gel. Any conventional batch mixing apparatus can be employed for this purpose. After the gelling agent and the aqueous liquid have been mixed for a time sufficient to form the base gel, a quantity of crosslinking compound is mixed with the base gel.

The t-butyl hydroperoxide breaker can be added: to the aqueous liquid prior to gelling, simultaneously with the gelling agent during formation of the gel, to the base gel, or to the crosslinked gel. In each instance a highly temperature stable gel having the desirable breaking characteristics described above is formed.

Conventional propping agents can be employed with the fracturing fluid compositions of the present invention, examples of which are quartz sand grains, tempered glass beads, rounded walnut shell fragments, aluminum pellets, nylon pellets and similar materials. Propping agents are generally used in concentrations in the range of from about 1 to about 8 pounds per gallon of the aqueous liquid; however, higher or lower concentrations may be used as required. The particle size of propping agent employed is a function of the nature of the formation to be fractured, the pressure required to produce the fracture, and pumping fluid flow rates available, as well as other known factors. However, particle sizes in the range of about 200 to about 2 mesh on the U.S. Sieve Series scale can be employed in fracturing well formations with the compositions of the present invention.

The following examples will enable persons skilled in the art to further understand and practice the invention; however, the examples are not intended to limit the scope of this invention.

EXAMPLES

In the following examples gels are prepared which contain chemical additives as breakers. The gels are then allowed to break at the temperatures indicated. Data recorded are breaking time versus viscosity wherein the viscosity recorded in Tables B, C, and E is measured in centipoises on a Model 35 Fann Viscometer at 300 rpm, the viscosity recorded in Table D is measured in centipoises on a Model LVF Brookfield Synchro-Lectric viscometer at 6 rpm using a No. 3 spindel, and the viscosity recorded in TABLE F is measured in centipoises on a Model 50 Fann Viscometer at 300 rpm.

The chemicals utilized in the Examples are listed in Table A below.

TABLE A

Aqueous Liquids:
  Water.
  95% by volume water — 5% by volume methanol.
  60% by volume water — 40% by volume methanol.
Gelling Agents:
  GA-1    hydroxyethylcellulose containing 2.5
          moles of ethylene oxide per anhydroglucose
          unit.
  GA-2    hydroxyethylcellulose containing 1.5 moles
          of ethylene oxide per anhydroglucose unit.
  GA-3    sodium carboxymethylcellulose containing 0.9
          moles of sodium carboxymethyl groups per
          anhydroglucose unit.
Crosslinking Agent:
  CA-1    ammonium tetralactotitanate(IV).
Breaker:
  TBP     t-butyl hydroperoxide
  SP      sodium peroxydisulfate
  AP      ammonium peroxydisulfate

EXAMPLE I

Example I

| GEL RECIPE Ingredient | Amount | Ratio Per 1000 Gallons Aqueous Liquid |
|---|---|---|
| 60% Water — 40% Methanol | 250 cc | — |
| GA-1 | 1.2 grams | 40 pounds |
| TBP (Run 1) | 0.7 cc | 2.8 gallons |
| TBP (Run 2) | 1.05 cc | 4.2 gallons |
| SP (Run 3) | 0.45 grams | 15 pounds |

Runs 1, 2, and 3 are each conducted at a temperature of 140°F. The results are set out in Table B below.

TABLE B

| Time (Hours) | Viscosity, Centipoises | | |
|---|---|---|---|
| | Run 1 | Run 2 | Run 3 |
| 0.5 | 24 | 23.5 | 21.5 |
| 1 | 23.5 | 23 | 20.5 |
| 2 | 22 | 21 | 5 |
| 3 | 20.5 | 19.5 | 5 |
| 4 | 19.5 | 18 | — |
| 6 | — | — | 4.5 |
| 24 | 7.5 | 2.5 | — |

Table B shows that the breaker of this invention (TBP) produces a controlled reduction in viscosity at 140°F of a gel prepared by combining a methanol-water solution with hydroxyethylcellulose. The gel of this invention, Runs 1 and 2, exhibits viscosities in excess of 75 percent of initial viscosity after more than 2 hours as compared to a gel not within the scope of this invention, Run 3, which does not exhibit satisfactory viscosity retention in the same period of time.

EXAMPLE II

Example II

| GEL RECIPE Ingredient | Amount | Ratio Per 1000 Gallons Aqueous Liquid |
|---|---|---|
| Water | 250 cc | — |
| GA-2 | 3.3 grams | 110 lbs |
| TBP (Run 1) | 3.5 cc | 14 gals |

Example II-continued

| GEL RECIPE Ingredient | Amount | Ratio Per 1000 Gallons Aqueous Liquid |
|---|---|---|
| TBP (Run 2) | 8.75 cc | 35 gals |

Runs 1 and 2 are each conducted at a temperature of 140°F. The results are set out in Table C below.

TABLE C

| Time (Hours) | Viscosity, Centipoises | |
|---|---|---|
| | Run 1 | Run 2 |
| 0.5 | 185 | 178 |
| 1 | 172 | 175 |
| 2 | 177 | 172 |
| 3 | 168 | 153 |
| 4 | 162 | 117 |
| 6 | 123 | 52 |
| 24 | 5 | 2.5 |

Table C shows that the breaker of this invention (TBP) produces a controlled reduction in viscosity, at 140°F, of a gel prepared by combining water with hydroxyethylcellulose. The gel of this invention, Runs 1 and 2, exhibits viscosities in excess of 75 percent of initial viscosity after more than 2 hours.

EXAMPLE III

Example III

| GEL RECIPE Ingredient | | Ratio Per 1000 Gallons Aqueous Liquid |
|---|---|---|
| Water | 250 cc | — |
| GA-3 | 1.5 grams | 50 lbs |
| CA-1 | 0.075 grams | 2.5 lbs |
| TBP (Run 1) | 0.48 cc | 1.75 gals |
| AP (Run 2) | 0.0038 grams | 0.125 lbs |
| SP (Run 3) | 0.0038 grams | 0.125 lbs |

Runs 1, 2, and 3 are each conducted at a temperature of 160°F. The results are set out in Table D below.

TABLE D

| Time (Hours) | Viscosity, Centipoises | | |
|---|---|---|---|
| | Run 1 | Run 2 | Run 3 |
| 0.5 | 10,800 | 9,400 | 9,000 |
| 1 | 8,400 | 4,400 | 3,400 |
| 2 | 6,100 | 300 | 300 |
| 3 | 3,200 | 150 | 200 |
| 4 | 600 | 120 | 150 |
| 24 | 100 | 100 | 100 |

Table D shows that the breaker of this invention (TBP) produces a controlled reduction in viscosity at a temperature of 160°F with respect to a gel prepared by combining water with a carboxymethylcellulose wherein the produced gel is crosslinked. The crosslinked gel of this invention, Run 1, exhibits viscosities in excess of 50 percent of initial viscosity after more than 2 hours as compared to a crosslinked gel not within the scope of this invention, Runs 2 and 3, which does not exhibit satisfactory viscosity retention in the same period of time.

EXAMPLE IV

Example IV

| GEL RECIPE Ingredient | Amount | Ratio Per 1000 Gallons Aqueous Liquid |
|---|---|---|
| Water | 250 cc | — |
| GA-2 (Run 1) | 1.2 grams | 40 lbs |
| GA-2 (Run 2) | 2.4 grams | 80 lbs |
| TBP | 0.000875 cc | 0.0035 gal |

Run 1 is conducted at 200°F. Run 2 is conducted at 240°F. The results are set out in Table E below.

TABLE E

| Time (Hours) | Viscosity, Centipoises | |
|---|---|---|
| | Run 1 | Run 2 |
| 0.5 | 16.5 | 84 |
| 1 | 15.5 | — |
| 2 | 14.5 | 70 |
| 3 | 13.5 | — |
| 4 | 12.5 | 57 |
| 6 | 9.5 | — |
| 24 | 2.5 | 7.5 |

Table E shows that the breaker of this invention (TBP) is useful at low concentrations to produce a controlled reduction in viscosity at temperatures in excess of 200°F of gels prepared by combining water with hydroxyethylcellulose. The gel of this invention, Runs 1 and 2, exhibits viscosity in excess of about 75 percent of initial viscosity after more than about 2 hours.

It is noted that the viscosity measurements in Run 2 were conducted at 170°F. Run 2 is conducted in a closed container at temperatures in excess of the boiling point of the fluid. It is accordingly necessary to cool the fluid below the boiling point as a prerequisite to viscosity measurement.

EXAMPLE V

Example V

| GEL RECIPE Ingredient | Amount | Ratio Per 1000 Gallons Aqueous Liquid |
|---|---|---|
| 95% Water — 5% Methanol | 250 cc | — |
| GA-2 | 2.4 grams | 80 lbs |
| TBP | 0.00875 | 0.035 gal |

This run is conducted at 260°F. The results are set out in TABLE F, below.

TABLE F

| Time (Hours) | Viscosity, Centipoises |
|---|---|
| 0.5 | 30 |
| 1 | 25 |
| 2 | 19 |
| 3 | 16 |
| 4 | 14.5 |
| 24 | 2.0 |

Table F shows that the breaker of this invention (TBP) produces a controlled reduction in viscosity at 260°F of a gel prepared by combining a methanol-water solution with hydroxyethylcellulose. The gel exhibits viscosities in excess of 50 percent of initial viscosity after more than 2 hours.

This invention is not limited to the above described specific embodiments thereof; it must be understood therefore that the detail involved in the descriptions of the specific embodiments is presented for the purpose of illustration only, and that reasonable variations and modifications, which will be apparent to those skilled in the art, can be made in this invention without departing from the spirit or scope thereof.

Having thus described the invention, that which is claimed is:

1. A method for producing a gradual reduction in viscosity of an aqueous gel said method consisting essentially of incorporating t-butyl hydroperoxide in said aqueous gel in a concentration sufficient to produce a complete break of said gel within about 24 hours at a temperature of up to about 300°F, wherein said aqueous gel consists essentially of
   an aqueous liquid, comprising a water-alcohol solution having in the range of about 0 to 100 percent alcohol by volume of solution;
   a gelling agent selected from galactomannan gums and derivatives thereof, glucomannan gums and derivatives thereof, and cellulose derivatives having molecular weights of at least about 100,000; and, optionally,
   a suitable crosslinking agent present in a concentration in the range of 0 to about 0.5 percent by weight of said aqueous liquid.

2. The method of claim 1 wherein said temperature is in the range of about 140°F to about 260°F.

3. The method of claim 2 wherein said gelling agent is present in a concentration in the range of about 10 to about 150 pounds per 1,000 gallons of said aqueous liquid.

4. The method of claim 3 wherein said t-butyl hydroperoxide is present in the range of about 0.0007 to about 50 gallons per 1000 gallons of said aqueous liquid.

5. The method of claim 4 wherein said alcohol is an alkanol having 1 to 5 carbon atoms and further wherein said alkanol is present in said solution in the range of about 0 to 40 percent by volume.

6. The method of claim 5 wherein said crosslinking agent is a compound capable of providing metal ions selected from aluminum(III), boron(III), antimony(III), antimony(V), titanium(II), titanium(IV), chromium(VI), chromium(III), iron(II), iron(III), nickel(II), niobium(V), manganese(VII), arsenic(III), arsenic(V), tantalum(V), tin(II), and lead(II), wherein said compound is present in a concentration in the range of about 0.001 to about 0.5 percent by weight of said aqueous liquid.

7. The method of claim 6 wherein said crosslinking agent is a compound capable of providing metal ions selected from aluminum(III), boron(III), antimony(V), titanium(IV), and chromium(III), wherein said compound is present in a concentration in the range of about 0.006 to about 0.25 percent by weight of said aqueous liquid.

8. The method of claim 2 wherein said gelling agent is present in the range of about 25 to 120 pounds per 1,000 gallons of said aqueous liquid and is selected from guar gum, sodium carboxymethylcellulose, sodium carboxymethylhydroxyethylguar and hydroxyethylcellulose.

9. The method of claim 8 wherein said t-butyl hydroperoxide is present in the range of about 0.0035 to about 35 gallons per 1,000 gallons of said aqueous liquid.

10. The aqueous gel of claim 9 wherein said alkanol is methanol.

11. The method of claim 10 wherein said crosslinking agent is a compound selected from potassium pyroantimonate, sodium dichromate, ammonium tetralactotitanate(IV), and bis(triethanolamine)bis(isopropo)titanium(IV), wherein said compound is present in a concentration in the range of about 0.009 to about 0.1 percent by weight of said aqueous liquid.

* * * * *